(12) United States Patent
Christandl et al.

(10) Patent No.: US 10,162,099 B2
(45) Date of Patent: Dec. 25, 2018

(54) LIGHT GUIDE BLOCK HAVING A LUMINOUS FRAME

(71) Applicants: Dieter Christandl, Weiz (AT); Josef Christandl, St. Ruprecht/Raab (AT); Robert Hofer, St. Ruprechtl Raab (AT)

(72) Inventors: Dieter Christandl, Weiz (AT); Josef Christandl, St. Ruprechtl Raab (AT); Robert Hofer, St. Ruprechtl Raab (AT); Alexander Haider, Gleisdorf (AT); Oliver Fischer, Dombirn (AT)

(73) Assignees: Dieter Christandl, Weiz (AT); Jozef Christandl, St. Ruprecht/Raab (AT); Robert Hofer, St. Ruprecht/Raab (AT)

( * ) Notice: Subject to any disclaimer, the term of this patent is extended or adjusted under 35 U.S.C. 154(b) by 0 days.

(21) Appl. No.: 15/543,031

(22) PCT Filed: Oct. 30, 2015

(86) PCT No.: PCT/EP2015/002176
§ 371 (c)(1),
(2) Date: Jul. 12, 2017

(87) PCT Pub. No.: WO2016/112930
PCT Pub. Date: Jul. 21, 2016

(65) Prior Publication Data
US 2018/0003887 A1    Jan. 4, 2018

(30) Foreign Application Priority Data

Jan. 12, 2015  (DE) .................. 20 2015 000 056

(51) Int. Cl.
*F21V 8/00* (2006.01)
*E04C 1/42* (2006.01)
*E04C 2/54* (2006.01)

(52) U.S. Cl.
CPC .............. *G02B 6/0065* (2013.01); *E04C 1/42* (2013.01); *E04C 2/54* (2013.01); *G02B 6/0078* (2013.01); *G02B 6/0008* (2013.01)

(58) Field of Classification Search
CPC .. G02B 6/0015; G02B 6/0035; G02B 6/0065; G02B 6/0078
See application file for complete search history.

(56) References Cited

U.S. PATENT DOCUMENTS 6,104,454 A * 8/2000 Hiyama ............... G02B 6/0028
349/117
2007/0258015 A1* 11/2007 Diederiks ............... H04N 5/72
348/739

(Continued)

FOREIGN PATENT DOCUMENTS

JP        2005070660 A  *  3/2005

*Primary Examiner* — Mary Ellen Bowman
(74) *Attorney, Agent, or Firm* — Bowdy and Niemark, PLLC

(57) ABSTRACT

A light guide block is provided made up of a plurality of light guide rods that are molded in a curable filler material, wherein for manufacturing the light guide block, the curable filler material is fillable into an at least half-open trough, the light guide rods, as plastic injection-molded parts or plastic molded parts, being molded onto surfaces of the trough that is made, at least partially or in sections, of light-conducting plastic.

11 Claims, 5 Drawing Sheets

(56) References Cited

U.S. PATENT DOCUMENTS

| | | | |
|---|---|---|---|
| 2008/0137328 A1* | 6/2008 | Lee | G02B 6/0078 362/224 |
| 2010/0053861 A1* | 3/2010 | Kim | H04M 1/22 361/679.01 |
| 2010/0091293 A1* | 4/2010 | Shani | G02B 6/0035 356/477 |
| 2012/0120677 A1* | 5/2012 | Miyairi | G02B 6/0035 362/602 |
| 2012/0140513 A1* | 6/2012 | Shibata | G02B 6/0035 362/602 |
| 2015/0241848 A1* | 8/2015 | Willemin | G04B 19/32 362/23.16 |

* cited by examiner

LIGHT GUIDE BLOCK HAVING A LUMINOUS FRAME

The invention relates to a light guide block made up of a plurality of light guide rods that are molded in a curable filler material, wherein for manufacturing the light guide block, the curable filler material is fillable into an at least half-open trough.

Light guide blocks made up of a plurality of light guide rods that are molded in a curable filler material have become known in various embodiments. For example, it is disclosed in U.S. Pat. No. 4,570,207 A that the curable filler material is a concrete material that is able to transmit high loads, and that each of the light guide rods molded therein is visible at the two opposite flat sides of the light guide block.

However, in the manufacture of a light guide block according to U.S. Pat. No. 4,570,207 A, it is necessary for the light guide block to be inserted into a mold in which the light guide rods are already arranged, and for the mold to be subsequently filled with the curable filler material.

Figure 6:
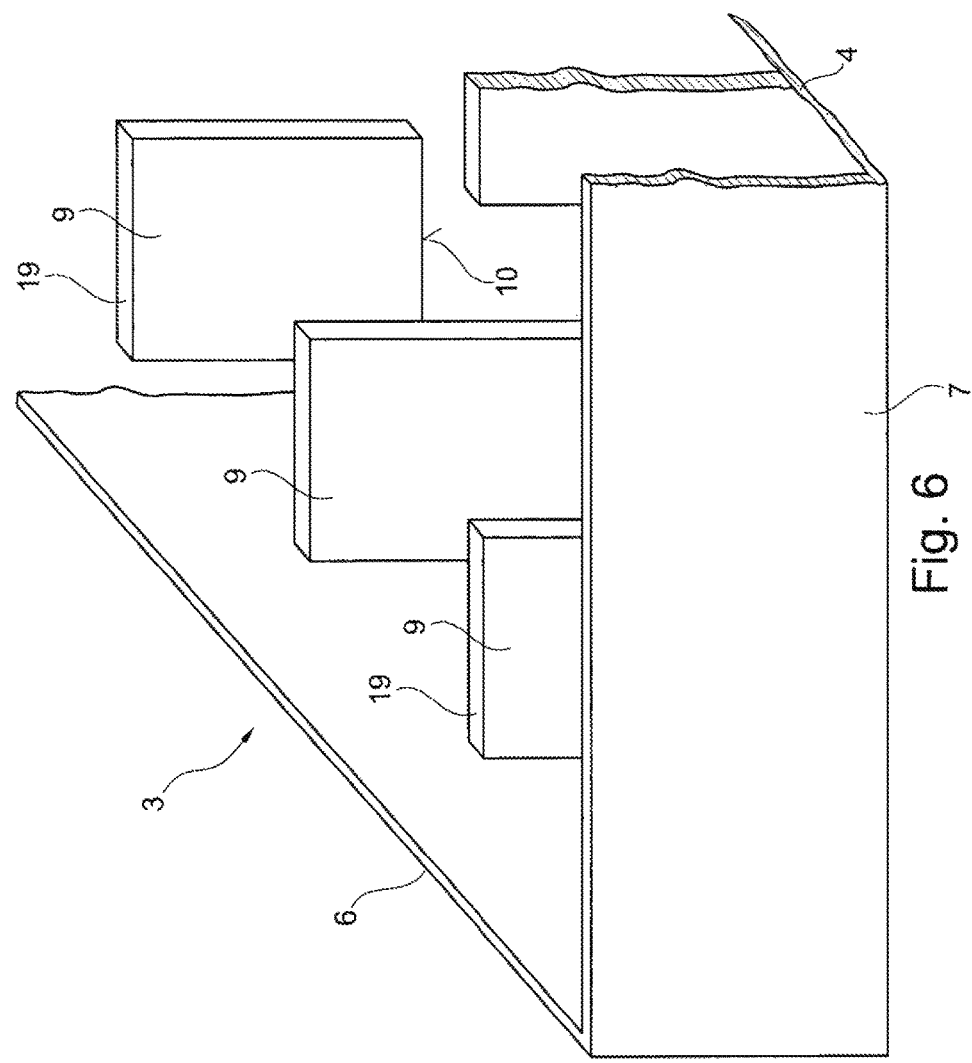

An example of this type of mold is provided in EP 2 179 105 B1. FIG. 6 of the cited publication illustrates a half-open trough, in the interior of which the light guide rods are inserted in a fixed manner into a retaining structure.

One drawback of this arrangement is the high level of complexity for manufacturing a light guide block, since it is first necessary to fix the light guide rods in a suitable retaining structure, which must then be anchored in the casting mold in order to then fill the block, while ensuring that the overall structure in the trough to be filled is not bent, deformed, or even damaged due to the inflowing filler material.

Figure 7:
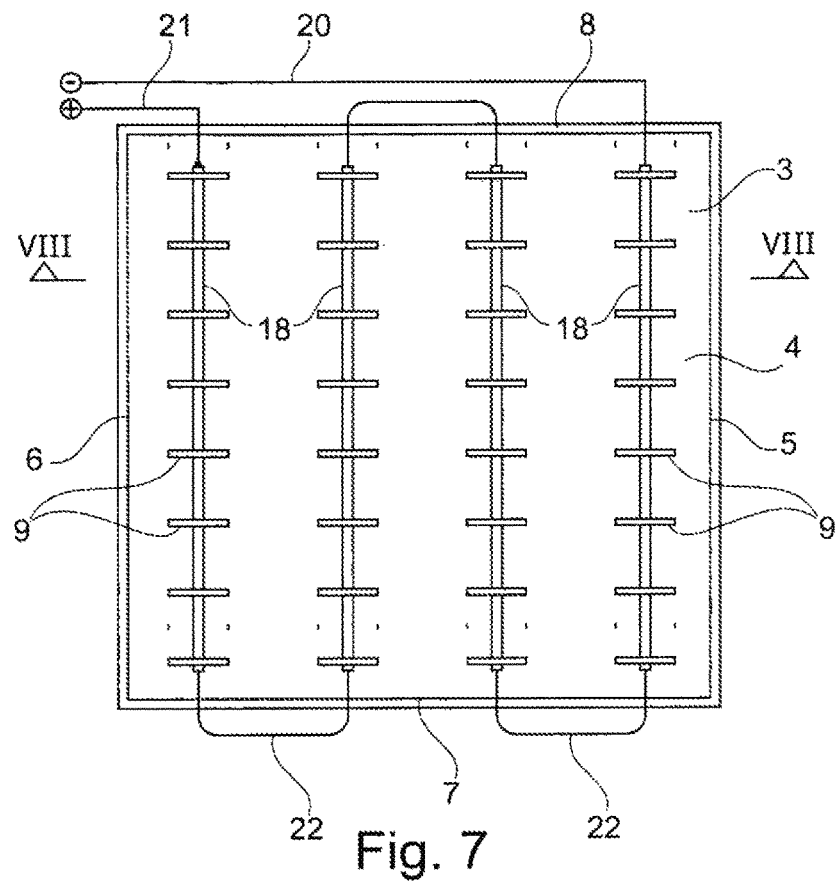

For this reason, according to FIG. 7 the cited publication provides a casting mold that is subdivided by tension bolts that are intended to withstand the high mold pressure during casting.

Accordingly, the drawback in the manufacture of such a light guide block lies in a high level of effort, since after the light guide block cures in the mold, it must be removed from the mold, the mold is then recleaned, and the mold surfaces to be filled are treated with a release agent in order to then fill a new light guide block.

The object of the invention, therefore, is to refine a light guide block of the type stated at the outset, in such a way that the manufacture of a light guide block involves significantly less manufacturing effort, and in addition even further luminous properties for such a light guide block are achievable.

For achieving the stated object, according to the invention, the light guide rods are now designed as plastic injection-molded parts or plastic molded parts, and are molded onto one or more surfaces of a trough that is made, at least partially or in sections, of light-conducting plastic.

With this technical teaching, a totally novel approach is taken for manufacturing light guide blocks, since the trough itself is now part of the light guide block, and according to the invention at least some or all surfaces of the trough made of a plastic are light-conducting in sections or in part, so that such a light guide block in the installed state together with the walls of the trough is luminous.

Accordingly, the trough forms a lost formwork for the light guide block on account of the fact that it adheres to the cured casting material of the light guide block and is installed together with the light guide block.

In one preferred embodiment, the light guide rods, as an injection-molded part, are integrally molded onto the trough that is likewise produced in the same injection molding process, so that the trough and the light guide rods molded thereon are produced in the same injection molding operation. In this case the injection mold is one piece, since the trough and the light rods are injected in a single work operation.

In another embodiment of the invention, it may be provided that the trough is first produced from a plastic injection-molded part, and, when the plastic of the trough is not yet cured, the light guide rods are then molded onto the surfaces of the trough in order to obtain a light-conducting, integrally formed, solid plastic injection-molded part. The injection mold in this case has a two-part design and is made up of a so-called progressive mold, since the trough and the light guide rods are produced in quick succession in the injection mold.

According to one aspect of the claimed subject matter, the surfaces of the trough are made, at least partially or in sections, of a light-conducting plastic.

The term "partially made of" means that it is not necessary to produce the plastic of the trough from the same light-conducting material as the plastic of the light guide rods molded thereon.

According to the manufacturing operation described above, the trough may initially be produced from a first plastic material which, for example, is also colored, translucent, partially transparent, or light-conducing in some other way, in order to then mold the light guide rods, made of the same or a different plastic material, onto the walls of the trough in order to achieve an integral bond between the light guide rods and the walls of the trough.

When the light guide rods are made of a different plastic material, they are not colored, for example, while the plastic material of the trough is colored.

Likewise, the plastic material of the trough may be made of a different plastic than the light guide rods that are molded onto it.

The term "made of in sections" means that it is not necessary for all surfaces of the trough to be made of a light-conducting material. For example, the base wall of the trough may be made of a light-conducting material in order to direct in a particularly advantageous manner a light source, situated on the base wall or below the base wall, onto all light guide rods that are integrally joined to the base wall. Light is hereby introduced in a particularly effective manner into the light guide rods that are molded onto the base side of the trough, since the irradiated light is distributed over the entire surface of the base side and illuminates it as well.

In this exemplary embodiment, in order to achieve the object it is not necessary for the peripheral walls of the trough to also be made of a light-conducting plastic, although such a design is preferred.

Accordingly, the term "trough" is understood to mean a container that is open on one side, and that forms the formwork shape for a curable compound to be poured in at that location. Thus, the term "trough" is understood to mean all formwork shapes that are open on at least one side, regardless of whether they are formed as one or multiple parts. A multiple-part trough is made up, for example, of a base wall to which the side, rear, and front walls are detachably fastenable.

In another embodiment of the invention, it may be provided that the base wall as well as all (or some) of the peripheral walls of the trough are made of a light-conducting plastic, resulting in the luminous frame of a light guide block, as stated in the title of the present invention.

This means that the trough as a whole is luminous; when such a light guide block having a trough made of light-conducting material is installed in a base surface, this results in a luminous, light-emitting, circumferential frame for the light guide block that is formed from the light-emitting front sides of the peripheral walls of the trough.

In other respects, the claimed subject matter does not explicitly include at which surfaces of the trough the light guide rods are molded onto. However, it is preferred for the light guide rods to be molded onto the base wall of the trough, thus forming an integral connecting surface, made of the plastic of the light guide rod, with the plastic of the base trough.

In another embodiment, however, it may also be provided that additional guide rods are molded onto the walls of the trough, or that light guide rods are molded solely onto the walls of the trough, and are angled in such a way that they likewise form a light-emitting upper visible side of the light guide block.

In one refinement, it may also be provided that a portion of the light guide rods are molded onto the base wall of the trough, and another portion of the light guide rods are molded onto the side walls of the trough. When the side walls of the trough are colored and the base wall is not, this results in a different light impression of the light guide rods, since the light guide rods adjoining the side wall direct a different color of light toward the visible side of the light guide block compared to the light guide rods that are molded onto the base wall.

It is likewise preferred for the base wall as a whole to be made of a light-conducting plastic. However, the invention is not limited thereto. It may also be provided that the base wall has only a partially light-conducting design (i.e., is not completely transparent) or is light-conducting only in sections, and that the light guide rods are molded on in these areas.

In one refinement of the invention, it may also be provided that the light-emitting frame of the light guide block does not have a circumferential design. After the light guide block is produced by molding into the trough, some walls of the trough may be removed in order to illuminate, for example, only the top strip and the oppositely situated bottom strip of the light guide block, which means that the side walls have been subsequently removed, and only the front wall and the oppositely situated rear wall of the trough form the light frame.

For introducing light into this type of light guide block, in which the trough itself, as a lost framework, represents at least a portion of the light conductor, there are various options for generating light.

In a first embodiment of the invention, it is provided that for generating light at the base wall of the trough, this base wall is coupleable to a number of light-generating light rods.

These types of light rods may be, for example, a chain of LEDs that are electrically connected to one another, or, for example, fluorescent lighting elements, filaments, and so forth.

Such luminous elements designed as light rods are preferably coupled to the base wall of the light guide block, and for this purpose it is provided according to the invention that the individual light rods, having a straight design, are inserted or wedged into associated longitudinal grooves in the base wall that are open at the bottom, and are each connected to one another in series, in order to form an LED light chain on the base side of the light guide block.

In another embodiment of the invention, it is provided that the light-emitting surface on the base wall of the trough is made up of a light panel in which a number of luminous elements, for example LEDs, are situated in a matrix-like arrangement, and that this light panel is detachably coupleable to the base wall of the light guide block.

For this purpose, it is preferable for the light guide panel to have lateral, frame-like circumferential locking legs that are lockable in an associated frame-like circumferential locking groove on the base wall of the trough.

Of course, for the coupling of the light panel it is also sufficient to provide appropriate detent or locking points at some locations, the light panel preferably being detachably connected to the base wall of the trough.

It is also preferable for even further openings to be present in the trough to ensure that moisture penetrating from above, which could possibly infiltrate the filler material, is downwardly discharged.

Accordingly, in the invention it is significant that the trough, as a luminous frame, results in a completely novel light impression, not known in the prior art, in the installation of such a light guide block. In addition to the types of light generation described here, it is also possible to insert light rods or luminous elements into the not yet filled trough, and to fill it with the filler material.

In one preferred embodiment of the invention, the filler material is made of a curable concrete. The invention is not limited thereto, and any desired filler material that is curable may be used. Consequently, plastic foams, gypsum, or other curable filler materials may also be used.

The inventive subject matter of the present invention results not only from the subject matter of the individual patent claims, but also from the combination of the individual patent claims with one another.

All information and features disclosed in the documents, including the abstract, in particular the spatial design illustrated in the drawings, are claimed as essential to the invention, provided that, alone or in combination, they are novel with respect to the prior art.

The invention is explained in greater detail below with reference to drawings that illustrate multiple implementation approaches. In this regard, further features and advantages of the invention that are essential to the invention emerge from the drawings and their description.

Figure 1:
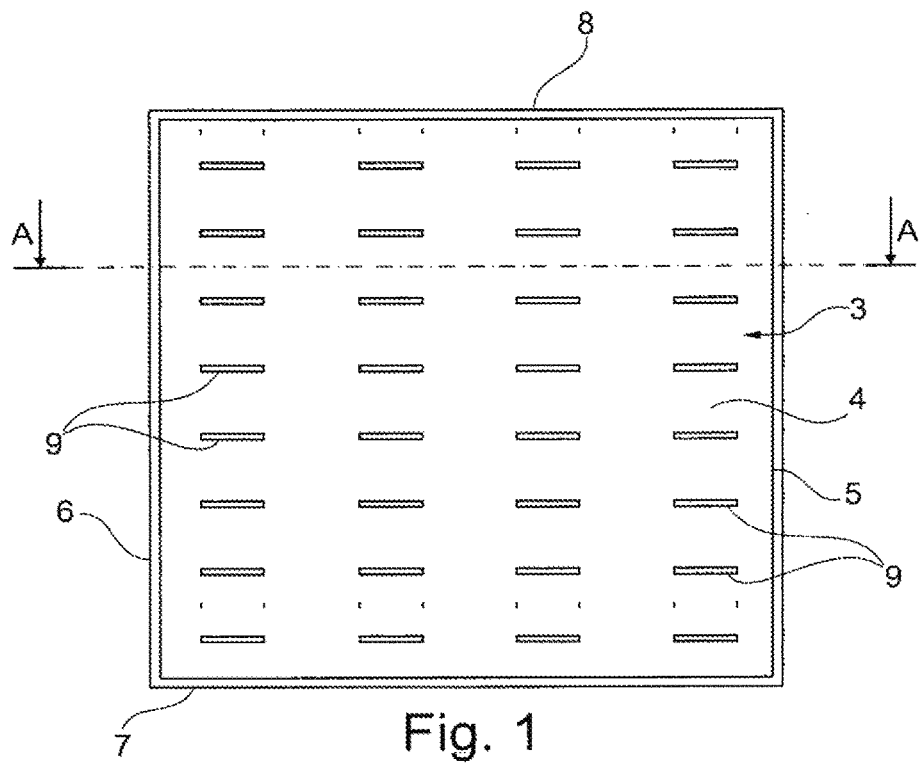
Figure 2:
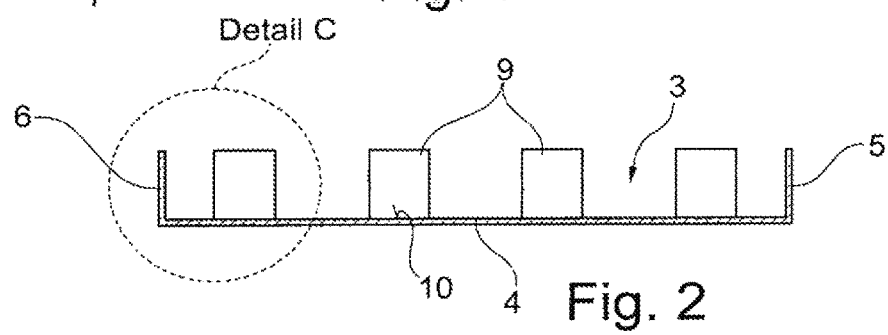
Figure 3:
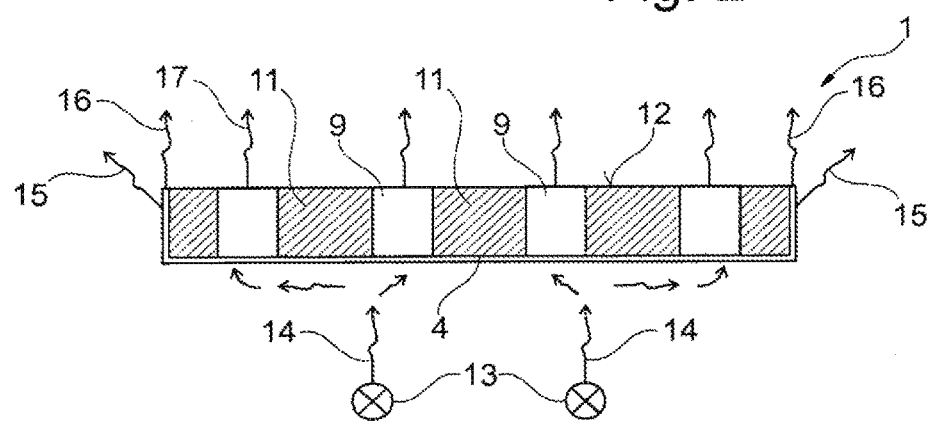
Figure 4:
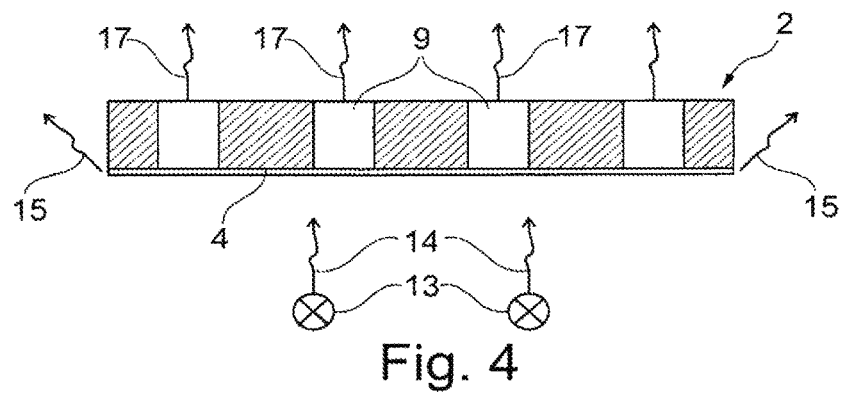
Figure 5:
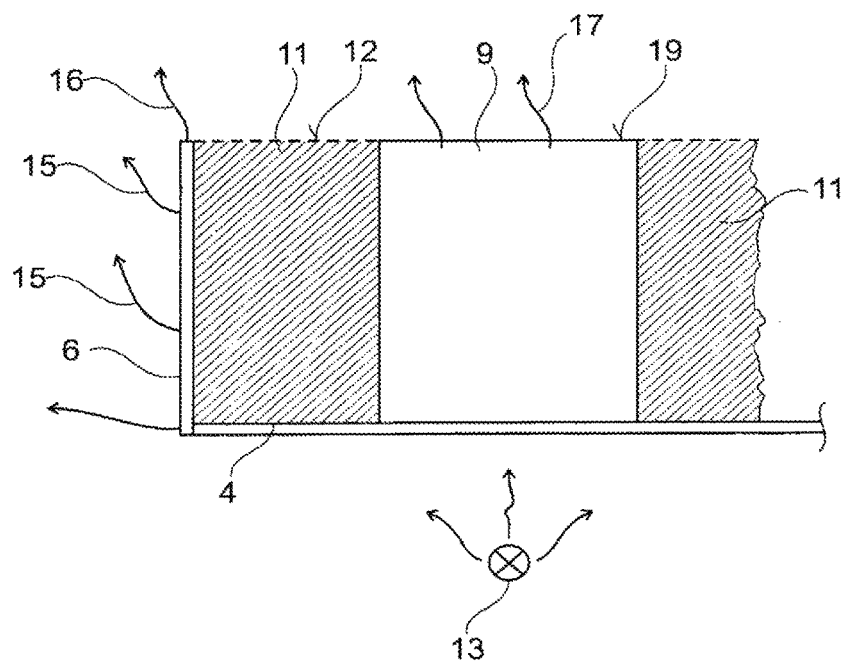
Figure 8:
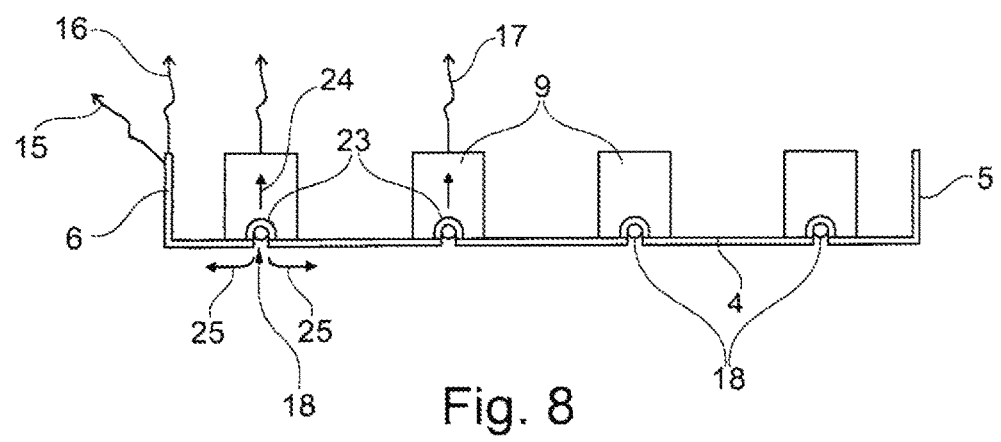
Figure 9:
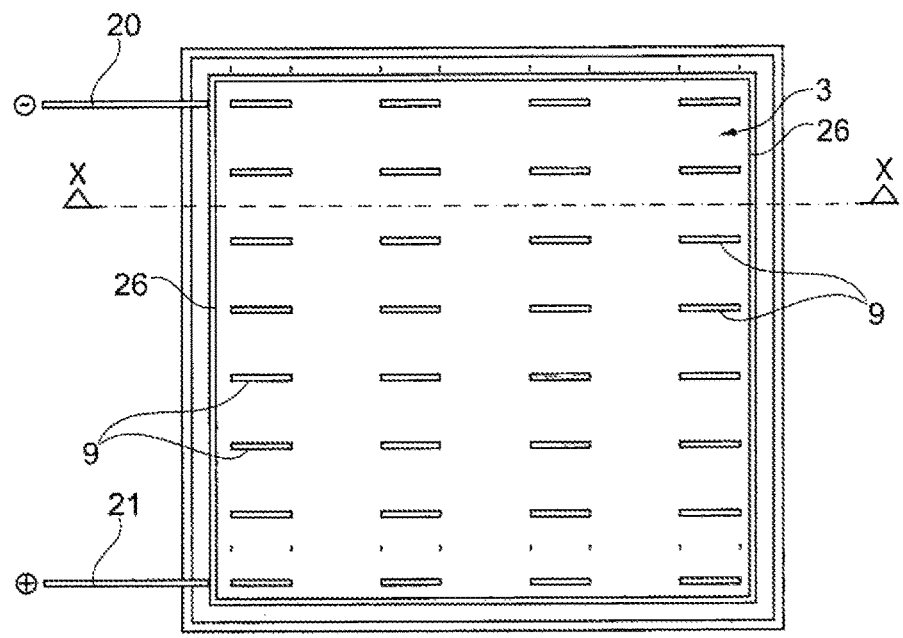
Figure 10:
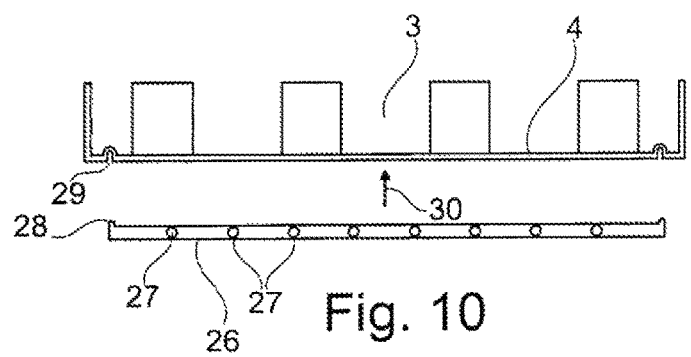
Figure 11:
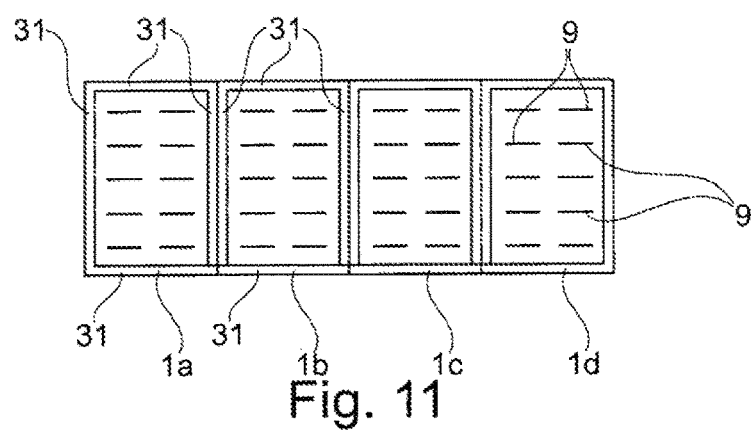

The figures show the following:

FIG. 1: schematically shows the top view of a light guide block in the not yet filled state;

FIG. 2: shows the light guide block according to FIG. 1 corresponding to the section of line A-A;

FIG. 3: shows the light guide block according to FIG. 2 in the filled state;

FIG. 4: shows one embodiment of a light guide block in a modification compared to FIG. 3;

FIG. 5: shows a detail C according to FIG. 2;

FIG. 6: shows a light guide block as a detailed illustration in the not yet filled state;

FIG. 7: shows the light guide block according to FIG. 2 with an illustration of the light generation via light rods;

FIG. 8: shows the section according to line VIII-VIII in FIG. 7;

FIG. 9: shows one embodiment in a modification compared to FIG. 7, in which a light panel is used for the light generation;

FIG. 10: shows an exploded illustration of the section according to line X-X in FIG. 9; and FIG. 11: shows the top view of the visible side of light guide blocks installed in a surface, with an illustration of the resulting luminous frame.

FIGS. 1 and 2 schematically illustrate a light guide block 1 made up of a plastic injection-molded part, which itself is formed from a light-conducting plastic.

The light guide block 1 is made up of a trough 3 comprising a base wall 4 onto which the side walls 5, 6 are molded. The trough 3 is closed off at the front and the rear by a front wall 7 and a rear wall 8, respectively.

In the exemplary embodiment shown, the light guide block 1 has outer dimensions of 396 mm×396 mm, for example, the width of the light guide rods 9 situated there is approximately 40 mm, and the distance between the light guide rods 9 is approximately 60 mm.

The thickness of the rear wall 8 and of all side walls is approximately 2 mm.

The height of the trough is approximately 51 mm, and the thickness of the base wall is approximately 1.5 mm.

It is apparent from FIG. 2 that a plurality of light guide rods 9 is integrally molded onto the base wall 4, in particular via the connecting surfaces 10 shown at that location.

It has been stated in the general description that the light guide rods 9 together with the trough 3 may be produced in the same injection molding process, or, in another embodiment, in a so-called progressive mold, in which the trough 3 is first injected, and the light guide rods 9 are subsequently molded onto the base wall 4 of the produced trough in the injection molding process.

It is important that a favorable optical transition results at the connecting surfaces 10 in order to allow light conduction at that location, preferably with no interference, between the base wall 4 and the light guide rods 9 mounted and molded thereon.

FIG. 3 shows a completely filled light guide block 1 produced according to FIGS. 1 and 2. It is apparent in the figure that the light guide block is filled with a curable filler material 11. Two light sources 13, spaced apart from one another, which direct a light against the base wall 4 in the arrow directions 14 are merely indicated schematically.

This light is distributed over the light-conducting base wall 4 in all directions, so that on the one hand the light penetrates into the bottom side of the light guide rods 9 in the depicted arrow directions, but on the other hand also exits laterally via the walls 4-8.

The peripheral walls 5-8 are thus luminous in the arrow direction 16 at the top, and also in the arrow direction 15 at the side, so that, depending on the presence of the walls 5-8, a circumferential or noncircumferential luminous frame results around the light guide block 1.

The primary light emission will take place in the arrow direction 17 via the light-emitting front sides of the light guide rods 9 that are directed upwardly toward the visible side.

FIG. 4 shows, in one exemplary embodiment in a modification compared to FIG. 3, that some walls, for example the side walls 5, 6, may be omitted, so that only the base wall 4 is present, and possibly also the front wall 7 and the rear wall 8, so that a luminous frame is still provided only in the area of the walls that are present, while the remaining wall surfaces are absent.

FIG. 5 shows, in an enlarged detail C from FIG. 2, that the light emission takes place over all surfaces of the walls 4-8.

FIG. 6 schematically shows a trough 3 according to the invention that is not yet filled with filler material 11.

FIG. 7 shows, as a first option for generating light, so-called light rods 18, which may be made up of individual LEDs that are linked to one another, and which as straight rods are clipped or wedged into associated longitudinal grooves 23 in the base wall 4 that are open at the bottom.

The LEDs form a continuous light chain, and are electrically connected to one another in series via the two power cables 20, 21.

Since the light-emitting light rods 18 are situated directly beneath the light guide rods 9, their light-emitting front side 19 emits a particularly intense light at the top in the arrow directions 17.

On the other hand, the light rods 18 also illuminate the base wall 4, so that light travels to the peripheral walls 5-8 in the depicted arrow directions 24, 25 and produces the luminous frame at that location.

In the series connection according to FIG. 7, the light rods 18 are electrically conductively connected in series via connecting cables 22.

FIGS. 9 and 10 show another preferred embodiment of the light generation, in which, according to FIG. 10, a light panel 26 is proposed which is designed, for example, as a current-conducting circuit board having a number of LEDs 27 arranged in a grid-like manner on its surface. The light panel 26 thus formed is coupled to the base wall 4 of the trough 3 by the fact that upwardly directed locking legs 28 are situated on the light panel 26, and are lockable into an associated circumferential locking groove 29 on the underside of the base wall 4.

Of course, the invention is not limited to this embodiment. Multiple locking points or locking surfaces may be present, and other detachable connections between a light panel 26 and the associated base wall 4 of the trough 3 may also take place. For example, mechanical locking means, adhesives, bonding agents, or the like may be situated between the light panel 26 and the base wall 4 of the trough 3.

FIG. 11 shows an installed state of light guide blocks adjacently arranged in a grid-like manner, it being apparent that the peripheral walls 5-8 shown here now form a luminous frame 31 that emits the light at the top.

The light panel 26, which introduces the light into the base wall 4 of a single light guide block 1 in the arrow direction 30, may be designed to be larger or smaller than the surface of the base wall. However, it may also be significantly larger, and may, for example, span the number of light guide blocks 1 illustrated in FIG. 11 on the base side. Thus, multiple adjacently situated light guide blocks are supplied with light, using one light panel 26.

In one embodiment not illustrated in the drawings, it is provided that the introduction of light takes place not at the base wall 4 of the trough 3, but, rather, at one or more of the side walls 5, 6 and/or the front and/or rear wall 7, 8, respectively.

All of the designs described above, which have been explained with regard to introduction of light into the base wall 4, are suitable for the type of light introduction into the aforementioned walls 5-8. Accordingly, the introduction of light via light guide rods 18 laid in longitudinal grooves 23 in the walls 5-8, as well as the introduction of light via light panels 26 which are now oppositely situated and in light-conducting contact with one or more of the walls 5-8, are possible.

The introduction of light into one or more of the side walls 5-8 has the advantage that the height of the light conductor block 1 is not increased, since the mounting of light-emitting elements on the base side is omitted.

However, it may also be provided that the light panel 26 is angled, and allows introduction of light into the base plate as well as introduction of light into one or more walls 5-8.

It may likewise be provided that the longitudinal grooves 23 together with the light guide rods 18 situated at that location are arranged in one or more of the walls 5-8 and also in the base wall 4.

LIST OF REFERENCE NUMERALS

1 light guide block
2 light guide block 3 trough (light-conducting)
4 base wall
5 side wall
6 side wall
7 front wall
8 rear wall
9 light guide rod
10 connecting surface
11 filler material
12 filling level
13 light source
14 arrow direction
15 arrow direction
16 arrow direction
17 arrow direction
18 light rod
19 front side (of 9)
20 power cable
21 power cable
22 connecting cable
23 longitudinal groove
24 arrow direction
25 arrow direction
26 light panel
27 LED
28 locking leg
29 locking groove
30 arrow direction
31 luminous frame

The invention claimed is:

1. A light guide block comprising:
a trough having at least one side open, and a base wall that comprises, at least partially or in sections, of light-conducting plastic, and
a plurality of light guide rods comprising plastic injection-molded parts or plastic molded parts, that are molded onto surfaces of at least the base wall of the trough, wherein the trough is filled with a curable filler material.

2. The light guide block according to claim 1, wherein the light guide rods are molded onto the base wall of the trough, which is light-conducting at least in part or in sections.

3. The light guide block according to claim 1, wherein the trough as a whole is produced from a light-conducting plastic, and at least some surfaces of the trough have a light-emitting design.

4. The light guide block according to claim 1, wherein some of the walls of the trough are removed.

5. The light guide block according to claim 1, wherein for generating light at the base wall of the trough, the base wall is configured to be coupled to a number of light-generating light rods.

6. The light guide block according to claim 1, wherein for generating light at the base wall of the trough, the base wall is configured to be coupled to a light-generating light panel.

7. The light guide block according to claim 1, further comprising flowthrough openings for discharging surface water situated in the base plate of the trough.

8. The light guide block according to claim 1, wherein the light guide block in the installed state forms a luminous frame on the visible side.

9. A light guide block comprising:
a trough having at least one side open, and a base wall and peripheral walls, the peripheral walls comprising, at least partially or in sections, of light-conducting plastic, and
a plurality of light guide rods comprising plastic injection-molded parts or plastic molded parts, that are molded onto surfaces of at least the base wall of the trough, wherein the trough is filled with a curable filler material.

10. The light guide block according to claim 1, wherein the trough is filled with the curable filler material up to a filling level that is defined by upper front sides of the light guide rods.

11. The light guide block according to claim 9, wherein the trough is filled with the curable filler material up to a filling level that is defined by upper front sides of the light guide rods.

* * * * *